M. KLAIBER.
FILM FEEDING MECHANISM.
APPLICATION FILED MAR. 24, 1909.
988,473.
Patented Apr. 4, 1911.
4 SHEETS—SHEET 4.
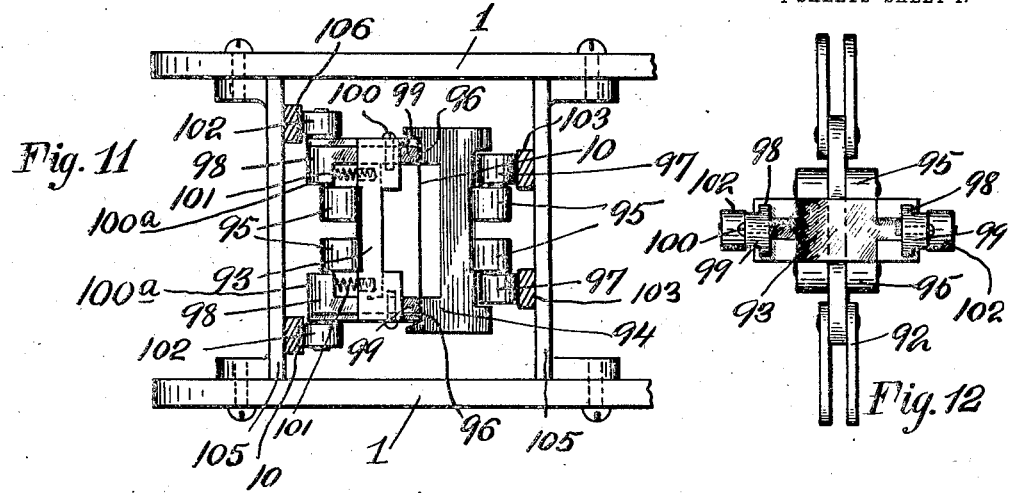
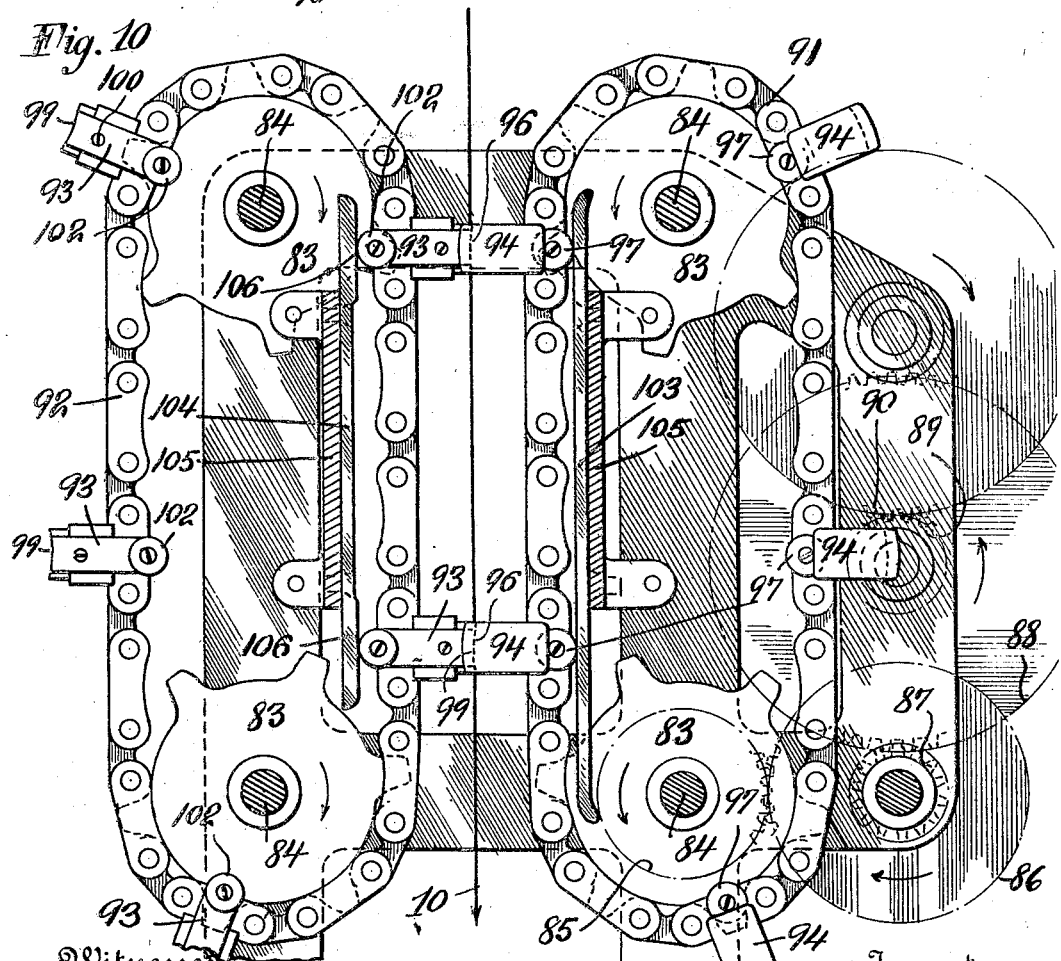
Witnesses
A. C. O'Connell
J. Richards
Inventor
M. Klaiber
By his Attorney
Wm. A. Megrath

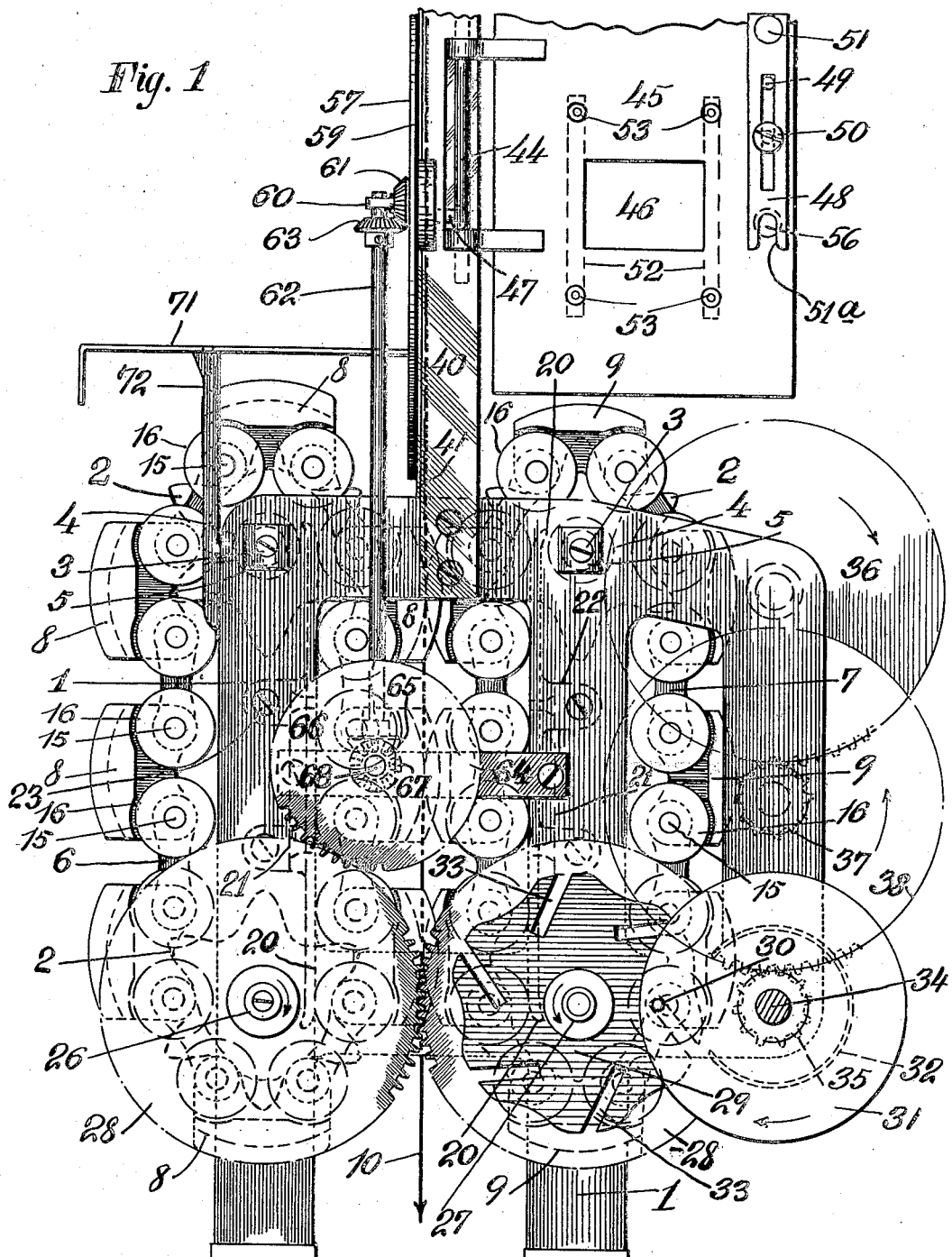

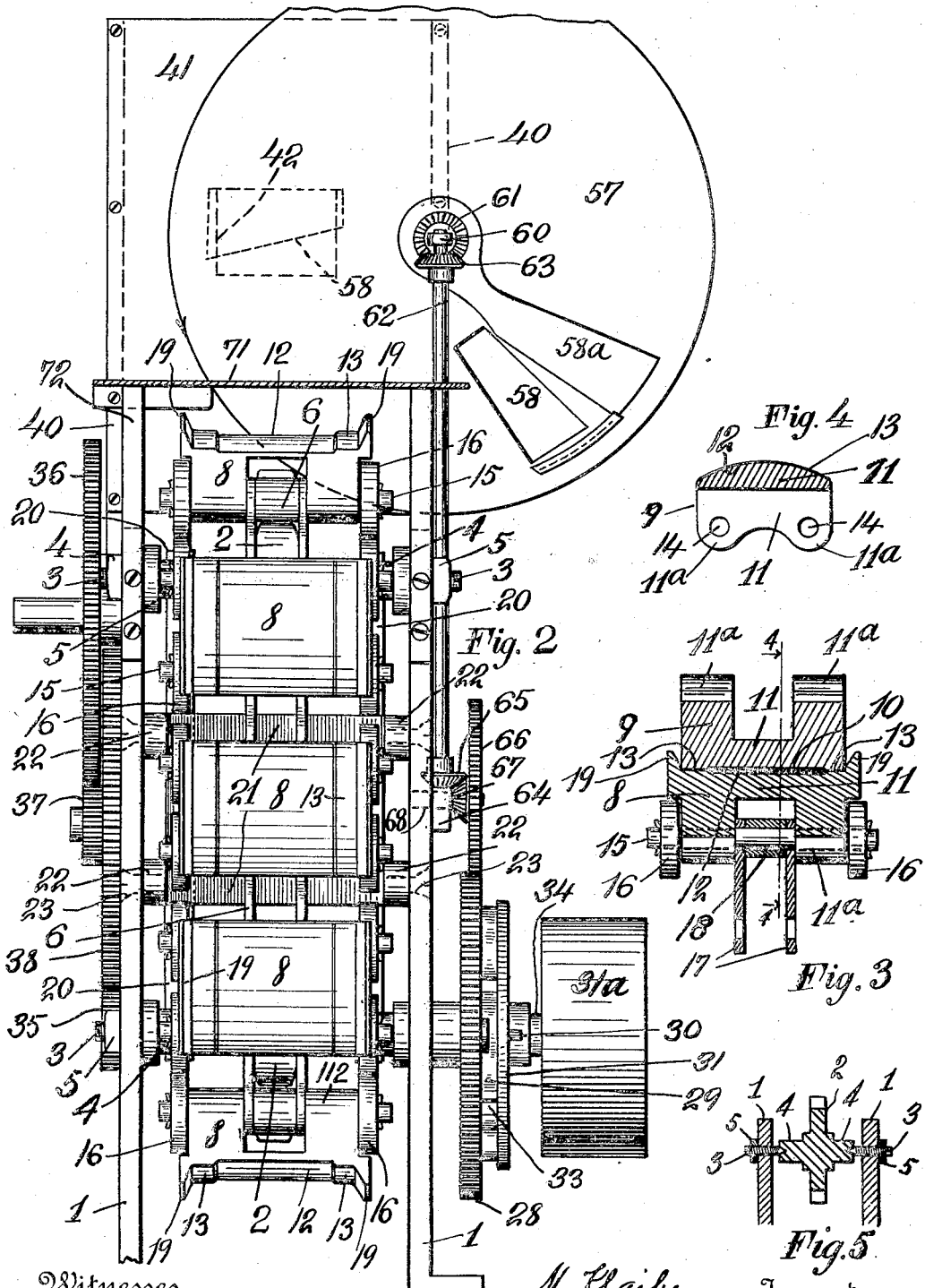

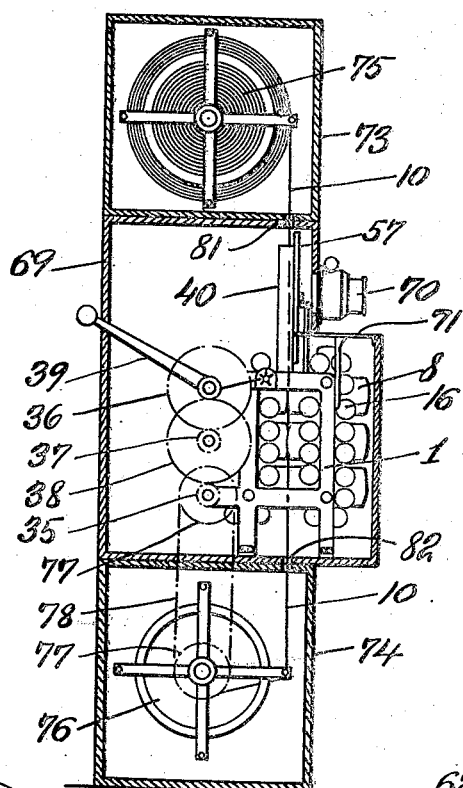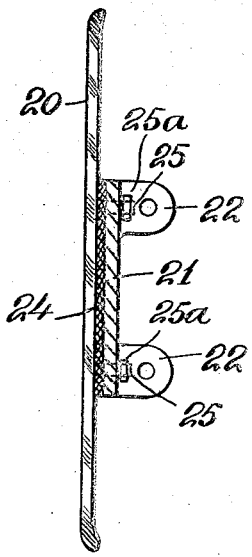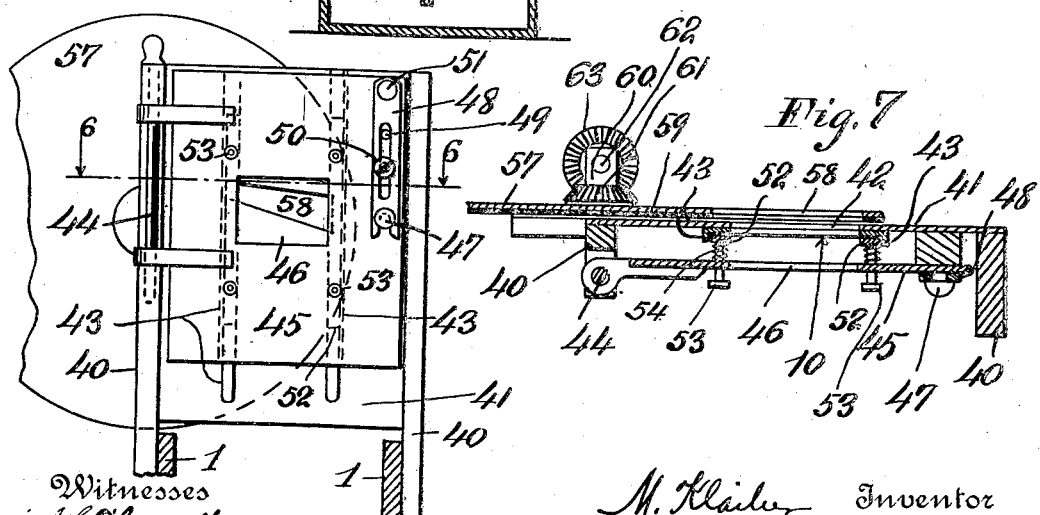

UNITED STATES PATENT OFFICE.

MAXIMILIAN KLAIBER, OF NEW YORK, N. Y., ASSIGNOR TO AMERICAN BIOSCOPE COMPANY, OF BROOKLYN, NEW YORK, A CORPORATION OF NEW YORK.

FILM-FEEDING MECHANISM.

988,473.

Specification of Letters Patent. Patented Apr. 4, 1911.

Application filed March 24, 1909. Serial No. 485,391.

*To all whom it may concern:*

Be it known that I, MAXIMILIAN KLAIBER, a citizen of the United States, and a resident of the borough of Brooklyn, city of New York, county of Kings, and State of New York, have invented certain new and useful Improvements in Film-Feeding Mechanism, of which the following is a specification.

This invention relates to film feeding apparatus, especially for use in cameras and picture projecting apparatus where a continuous strip of film is used.

The film heretofore used has been perforated along the longitudinal edges. Such a film has been objectionable because the teeth of the mechanism which feeds the film through the camera or through the exhibiting apparatus tears or strips the film, and it has been objectionable for other reasons well known to those acquainted with the art.

One of the objects of my invention is to provide suitable means for feeding unperforated film and to drive said means in some cases intermittently and in other cases continuously.

Another object is to provide improved means for guiding the unperforated film and holding the same in proper position behind the photographic lens.

Another object is to so mount, support, assemble and adjust the various parts of the machine as to make the same easily accessible for the purpose of cleaning, adjusting, repairing and also for the purpose of changing the film.

Other objects will appear from the hereinafter description.

The invention is fully disclosed by this specification taken in connection with the accompanying drawings which form a part of the specification.

Referring to the drawings, Figure 1 is a side elevation of the intermittent film feeding mechanism, this view showing the rear door for holding the film in place, open. Fig. 2 is a front view of the apparatus shown in Fig. 1; Fig. 3 is a sectional view of a pair of grippers in the position of gripping the unperforated film; Fig. 4 is a transverse sectional view of one of the grippers taken on line 4 of Fig. 3; Fig. 5 is a detailed view of means for mounting and adjusting the sprocket wheels; Fig. 6 is a rear view of the hinged clamp or door for holding the film in place behind the lens; Fig. 7 is a sectional view thereof on a larger scale on line 6 of Fig. 6; Fig. 8 is a view of the casing with a side removed, showing the relative location of all parts of the apparatus applied to a camera; Fig. 9 is a detailed view of one form of guide or track for controlling the grippers; Fig. 10 is a side elevation of a continuous moving means for gripping and feeding the film; Fig. 11 is a plan view of a pair of grippers shown in Fig. 10, said view also showing the relative location of the grippers, track and the frame; Fig. 12 is a detailed face view of one of the grippers with the ends of the chains connected thereto.

The intermittent driven mechanism for feeding the film will first be described.

In the several views the same reference characters designate the same part.

The part marked 1 represents two side frames, which are suitably connected together, and which form the support for the various parts of the driving mechanism.

2 are rotatably mounted sprocket wheels, there being four in the machine, but one being omitted in Fig. 1 for clearness in illustration. These sprocket wheels may be mounted on shafts extending from one side of the frame to another, but for the purpose of laterally adjusting the sprocket chains which are driven by said wheels, I prefer to mount the two upper sprocket wheels on studs 3, which are screw-threaded through bosses formed on the inside of the frame 1. The inner ends of these studs are pointed and project into recesses in the hub 4 of each of said sprocket wheels and form pivots on which the wheels rotate.

5 are nuts for locking the studs in position after the chain has been properly adjusted laterally. This manner of mounting the sprocket wheels also makes it easier to place and replace the chain. Driven by the sprocket wheels are the endless sprocket chains 6 and 7, every other link of which consists of grippers 8 and 9. Those forming part of the chain 6 are marked 8, and those forming part of chain 7 are marked 9. These grippers are alike in construction, with the exception hereinbelow stated.

The grippers on the two chains are so arranged in pairs that one gripper on one chain will coöperate with a gripper on the other chain, to grip and feed the photographic film 10. Each gripper consists of a block 11 having an outside convex face 12 and on the opposite side projecting lugs 11ª. The convex or outer surface is slightly depressed in the center, so as to leave two gripping surfaces 13 at the edges of the blocks. These gripping surfaces may be milled or formed with sharp points or projections to grip and hold the film during the operation of feeding the same. The lugs 11ª are each provided with apertures 14, through which pass pins 15 which connect together the gripper blocks and the links forming the chains 6 and 7. In this construction each chain consists alternately of a gripper and a pair of chain links. The ends of the links of the chain between the lugs 11ª are spaced by short sleeves 18. Secured to each end of these pins are rollers 16.

As heretofore stated, the grippers are alike, with the exception that those marked 8 and forming part of the chain 6 are wider than the grippers 9 forming part of chain 7, and the grippers 8 are provided with outwardly extending projections or lugs 19, so that when the said grippers meet in gripping the film the gripper 9 will be inside of gripper 8, with the film gripped between the milled or roughened meeting edges or surfaces 13. During the gripping operation of the film, the rollers 16 travel on the straight track 20 shown in dotted line in Fig. 1 and detailed in Fig. 8, and hold the gripping surfaces 13 of the gripper in operative contact with the edges of the film. The tracks 20 are carried by the supports 21, which extend from side frame to side frame inside the same and serve to hold the frames together. Each support is provided with lugs 22, by which they are fastened to the side frame by screws or bolts 23. To take up and compensate for any unevenness or inaccuracy in the construction and running of the chains and grippers, and to hold the grippers firmly against the film and to compensate for any unevenness in the film, resilient material 24 may be placed between the tracks 20 and the support 21. When this is done the tracks are secured to the supports by bolts 25, which pass loosely through the material and the said supports. This resilient material may be a sheet of rubber or the like, or a coiled spring may be placed around each bolt.

The grippers are intermittently driven by the following mechanism: Each of the two lower sprocket wheels are constructed with the shafts 26 and 27 on one side, which extend through the frame on that side, the other side of the sprocket being mounted with the adjusting stud 3 and locking nut 5 in the manner hereinabove described. Secured to each of these shafts outside of the frame are the gears 28, which mesh with each other. Secured to the shaft 27 outside of said gear is the Geneva stop 29, driven by the pin 30, which projects from the inner face of the disk 31 and engages in the notches 33 of the stop 29. Projecting from the inner face of this disk is a partial ring 32 for locking the Geneva stop 29. The disk 31 is secured to the shaft 34, which extends through both sides of the frame, and a balance wheel 31ª may be secured to the shaft 34 adjacent to the stop mechanism. On the opposite end of this shaft and outside of the frame of the machine is secured a pinion 35, which is driven from the gear 36 through the pinion 37 and gear 38 mounted on studs secured to the side of the frame. The gear 36 may be operated by a crank 39, or it may be driven by a motor.

The gears and Geneva movement are so constructed and proportioned that for each revolution of gear 36 the pinion 35 and disk 31 carried thereby makes sixteen revolutions, and for each revolution of disk 31 the Geneva stop 29 is moved one-sixth of a revolution. The pin 30 on the disk 31 and the slots 33 in the stop 29 are so arranged and located that the pin enters the slot in the arc of a circle, and at first transmits no movement to the stop. Before it reaches the bottom of the slot a slow movement is given to the stop from the time it starts to leave the bottom of the slot and until leaving the slot it gives a very rapid motion to the stop, and as the film is at all times engaged by one or more of the grippers it is fed quickly through the space of one picture when the Geneva stop is moved and at other times the film is at rest.

Secured to each side frame 1 is a support 40, to which is secured a plate 41, having an opening 42 therein. Secured to the rear of this plate adjacent to the opening are the two vertical angle pieces 43, forming guides for the film. On one of the uprights 40 is pivoted at 44 a plate or door 45, having an opening 46 therein registering with the opening 42. A headed stud 47 is secured to the rear of the plate 41, and projects through an opening 56 in the door when the door is closed. The door carries a slide 48, forming a latch to hold the door closed. This slide is guided by a pin 49 and screw 50, and is operated by the knob 51. The lower end of the slide is provided with a recess and notch 51ª, forming two fingers which take under the head of the stud 47. Carried by the door and on the inside thereof are strips 52, which meet with the angle pieces 43. Secured to these strips are studs 53, which project through openings in the door.

54 are coil springs surrounding the studs, and which yieldingly hold the strips 52 against the angle pieces 43 or against the film when the film is in position and the door closed.

In front of the plate 41 is pivoted the shutter 57, having an opening 58 therein, The size of this opening may be varied by the slide 58ª, or by any other well-known means. The rear of this shutter is covered with a soft facing or packing 59 to prevent the leakage of light. The shutter is pivoted on a stud 60, and carries a bevel gear, 61, which meshes with another bevel gear 63 mounted on a vertical shaft 62, the upper end of the shaft being secured in the stud 60, which forms a bearing for this end of the shaft. The lower end of this shaft is supported in a bracket 64 secured to the side of the frame and carries the bevel gear 65, which meshes with and is driven by bevel gear 67, secured to gear 66 mounted on the stud 68. The gear 66 meshes with and is driven from the gear 28. The gears are so proportioned that for each one sixth of the revolution of the sprocket wheels the shutter makes a complete revolution.

In Fig. 8 is shown the relative location of the different parts of the apparatus applied to a camera. The above described feeding mechanism is mounted in the camera casing proper 69, which carries the usual lens 70. Below the lens is a platform 71 mounted on arm 72, secured to the front of the machine, said platform being provided to protect the front part of the driving mechanism. To the camera proper is secured the box 73, in which is mounted the supply spool of film 75. Below the camera proper is secured a similar box 74, in which is mounted the take-up spool 76, on which the film is wound after being exposed. This take-up spool may be driven from the shaft 34 by means of sprocket wheels 77 and sprocket chain 78. The supply of fresh film is carried by the spool 75. The end of the film passes through the opening 81 in the top of the camera and in the bottom of the spool box 73, and then between the angles 43 back of the opening 42 in the plate 41 down between the grippers of the feeding mechanism through the opening or slot 82 in the bottom of the camera and the casing 74 to the take-up roll 76, where the end is secured. The door 45 is then closed and fastened with the strips 52 yieldingly bearing against the edges of the film at the rear to hold the film in position back of the opening 42. When the feeding mechanism is operated the film by the means hereinbefore described is intermittently and quickly pulled down or changed by the grippers during the period of rest of the film. The opening 58 in the shutter passes back of the lens 70, uncovering the same, whereupon that portion of the film is exposed; as soon as the opening passes beyond the lens another portion of the lens is quickly moved and fed behind the lens for exposure.

In Figs. 10, 11 and 12, I have shown a modified construction of means for feeding the film. In this construction, the grippers are continuously driven, although the film itself is intermittently moved. In said construction, I mount four sprocket wheels 83 on shafts or studs 84. These sprocket wheels have the same number of teeth as sprocket wheels 2, except that the teeth are spaced farther apart. On one of the shafts 84 I secure a gear 85, which is continuously driven through the chain of gears and pinions 86, 87, 88, 89 and 90, by hand or by a motor. The take-up roll of the film, may be driven in the same manner as in the construction hereinabove described and the two lower sprocket wheels are connected to be uniformly driven by intermediate gears like 28, not shown in Fig. 10. The sprocket wheels drive the two endless chains 91, 92, each of which carries grippers, 93 and 94. Each gripper is provided with lugs, to which the links of the chain are connected. These grippers are of different construction than those in the feeding mechanism hereinabove described and will now be described; the gripper 94 is provided with a narrow convex gripping surface 96 at the ends thereof and carries the rollers 97 on the rear side. The other gripper 93 is provided with two slides 98, each of which has a concave gripping surface 99 which co-acts with the convex surface 96. These gripping surfaces may be furnished or provided with pointed projections to grip and hold the film during the operation of feeding the same. These slides are provided with inwardly projecting lugs 100ª, and between the lugs and the rear face of the body of the gripper are placed springs 101, which tend to force the slides to the rear or away from the face of the gripper 94, and this rear or outward movement is limited by stops, which may be pins or screws 100. To each slide is mounted a roller, 102. The rollers 97 of the opposite gripper move on a straight track 103, while the rollers 102 run on the uneven or cam track 104, the part marked 106 indicating the cam or raised portion of that track. The tracks are mounted on supports 105, which extend from one side frame to the other.

In operation both the sprocket chains 91 and 92 are continuously driven, and rollers 97 on the grippers 98 move along the track 103 in a straight line, and the rollers 102 on the other grippers move along the cam track 104. Normally, the spring 101 forces the slides 98 away from the gripping faces of the grippers 94. When the rollers 102 come in contact with the cam or raised portion of the track 106, the slides 98 are forced toward the gripping faces of the gripper 96 against the tension of the said springs, and if the film 10 is in proper position the gripping faces of the slides 98 will engage the film and hold it tightly between the gripping faces or surfaces of the grippers, and so long as the rollers 102 are traveling on the raised or cam surface of 106 the film will be moved or pulled down the distance of said cam surfaces. As soon as these rollers pass beyond the cam surface 106 the springs 101 throw the slide to the rear, the grippers are disengaged from the film, and the film comes to a stop. From this construction it will be seen that the film is intermittently moved or fed, while the grippers and the means for moving the grippers are continuously traveling.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention, which, as a matter of language, might be said to fall therebetween.

Having now described my invention, what I claim as new and desire to secure by Letters Patent is:

1. In a device of the class described, a supply roll, a take-up roll, a film extending from one roll to the other, endless chains having grippers, said grippers having gripping surfaces for engaging the film, and means for intermittently causing said surfaces to feed the film.

2. In a device of the class described, a supply roll, a take-up roll, a film extending from one roll to the other, an endless chain on one side of the film and an endless chain on the other side of the film, each of said chains formed with grippers having gripping surfaces to engage opposite sides of the film near the edges thereof, and means for driving said chains.

3. In a device of the class described, a supply roll, a take-up roll, a film extending from one roll to the other, an endless chain on one side of the film and an endless chain on the other side of the film, said chains being composed partly of grippers, said grippers having gripping surfaces near the end thereof and co-acting to grip the edge of the film and hold the same, and means for intermittently moving said chains.

4. In a device of the class described, sprocket wheels, an endless sprocket chain carried thereby, other sprocket wheels, an endless sprocket chain carried thereby, each of said sprocket chains formed partly of grippers, each of said grippers having gripping surfaces at the ends thereof which co-act, a gear wheel connected to the sprocket of one chain and another gear wheel connected to the sprocket of the other chain, said gears intermeshing, a Geneva stop connected to one of the gears, said stop having slots therein, a disk, a pin carried by said disk co-acting with the slots in the Geneva stop, said pin and slots being so located as to give quick movement to the Geneva stop during partial revolution of the disk, and means carried by the disk to prevent rotation of the Geneva stop when the pin is out of engagement therewith.

5. In a device of the class described, a casing, a supply roll on one side of the casing and a take-up roll on the other, a film extending from one roll to the other and through the casing, a guide for the film, a door having yielding means thereon for holding the film in position in the guides, co-acting grippers for engaging each side of the film near the edge thereof, and means for moving said grippers.

6. In a device of the class described, a feed roll and a take-up roll, an endless chain on one side of the film and an endless chain on the opposite side of the film, said chains carrying a series of co-acting grippers having gripping surfaces at the ends thereof to grip the film near its edges, said chains carrying a series of rollers, tracks for the rollers, said tracks causing the grippers to engage the film, and means for moving said chains.

7. In a device of the class described, a feed roll and a take-up roll, an endless chain on one side of the film and an endless chain on the opposite side of the film, said chains carrying a series of co-acting grippers having gripping surfaces at the ends thereof to grip the film near its edges, said chains carrying a series of rollers, yielding tracks for the rollers, said tracks causing the grippers to engage the film, and means for moving said chains.

8. In a device of the class described, a supply roll and a take-up roll, a film extending from one roll to the other, a camera through which said film extends, a shutter in the camera having an opening therein, means for varying the size of the opening, grippers for engaging the film on each side near the edge of the film, means for holding the grippers in contact with the film during certain periods, and means for intermittently moving the grippers to feed the film.

9. In a device of the class described, an endless sprocket wheel having grippers thereon, the ends of the grippers having gripping surfaces, another endless sprocket having grippers thereon, said grippers having slides with gripping surfaces which co-act with the gripping surfaces of the first grippers, means for moving the slides toward the first grippers, means for moving said slides away from the grippers, and means for moving the chains.

10. In a device of the class described, a pair of sprocket wheels having an endless chain carried thereby, grippers carried by the said chain having rollers thereon, a straight track on which said rollers run, another pair of sprocket wheels, an endless sprocket chain carried thereby, grippers secured to said sprocket chain, said grippers having slides having gripping surfaces which co-act with the gripping surfaces of the first grippers, and means for moving the slides away from the gripping surface of the said first mentioned grippers, rollers on said slides, a track on which said rollers move, said track having a raised portion thereon which forces the slides toward the first mentioned grippers, and means for moving said chains.

11. A film feed mechanism comprising, in combination, a pair of oppositely-located endless members between which the film is arranged to pass; means for driving the same; gripping devices carried by said members; and means for moving said devices toward each other and into engagement with the film.

12. A film-feed mechanism comprising, in combination, a pair of oppositely-located endless members between which the film is arranged to pass; means for driving the same; correspondingly-located gripping devices carried by said members; and means for moving said devices toward each other at a predetermined point in their travel, to grip the film.

13. In a film-feed mechanism, the combination of a frame; film-conveying members arranged for movement therethrough; and means arranged within the frame for exerting a lateral pressure upon said members for holding the same in engagement with the film.

14. In a film-feed mechanism, the combination of a pair of oppositely-located movable members between which the film is arranged to pass; means for driving the same; and blocks carried by said members and arranged to grip and feed the film when said members are in motion, said blocks having their working faces roughened.

15. A film feeding mechanism comprising a pair of oppositely located movable members between which the film passes, means for driving said members, gripping devices carried by said members, and a track located adjacent to one of said members and arranged for engagement with the devices on said member during a portion of the travel of the latter and for guiding said devices toward and into engagement with the film.

16. In a film feeding mechanism, a pair of conveying members located upon opposite sides of the film, means for driving said members, and a guide or guides located adjacent to said members for directing said members toward and into engagement with the film.

In witness whereof I have hereunto set my hand at the city of New York, county of New York and State of New York, this twentieth day of March, 1909.

MAXIMILIAN KLAIBER.

In presence of—
AGNES C. O'CONNELL,
ISABEL R. RICHARDS.